United States Patent [19]
Lee et al.

[11] Patent Number: 5,692,259
[45] Date of Patent: Dec. 2, 1997

[54] RINSING METHOD FOR A WASHING MACHINE

[75] Inventors: Seung-Jun Lee, Buk-Ku; Chung-Sik Jung, Seo-Ku, both of Rep. of Korea

[73] Assignee: Daewoo Electronics Co., Ltd., Seoul, Rep. of Korea

[21] Appl. No.: 570,343

[22] Filed: Dec. 11, 1995

[30] Foreign Application Priority Data

Apr. 29, 1995 [KR] Rep. of Korea ................... 95-10393

[51] Int. Cl.⁶ .................................................. D06F 39/08
[52] U.S. Cl. ........................ 8/158; 68/12.05; 68/12.21; 8/159
[58] Field of Search ..................... 8/158, 159; 68/207, 68/12.05, 12.19, 12.21

[56] References Cited

U.S. PATENT DOCUMENTS

| | | | |
|---|---|---|---|
| 4,480,449 | 11/1984 | Getz et al. | 68/12.21 |
| 4,624,118 | 11/1986 | Yamakawa et al. | 68/12.21 |
| 4,862,710 | 9/1989 | Torita et al. | 68/12.21 |
| 5,167,722 | 12/1992 | Pastark et al. | 68/12.05 |

*Primary Examiner*—Frankie L. Stinson
*Attorney, Agent, or Firm*—Beveridge, DeGrandi, Weilacher & Young, LLP

[57] ABSTRACT

A rinsing method for a washing machine, which can prevent the waste of the washing liquid and can improve the rinsing effect, is disclosed. The rinsing method has the steps of introducing the washing liquid into an outer tub, spinning a spin tub such that the washing liquid contained in the clothing is discharged into a sump area, repeatedly spraying the washing liquid into the spin tub by circulating the washing liquid collected in the sump area, and draining the washing liquid collected in the sump area out of the washing machine. The rinsing method repeats the steps at least one time. Since the washing liquid is sprayed toward an upper wall of the spin tub, impurities formed between the outer tub and the spin tub are effectively removed. By the rinsing method, the washing liquid can be saved and the rinsing effect can be improved.

11 Claims, 4 Drawing Sheets

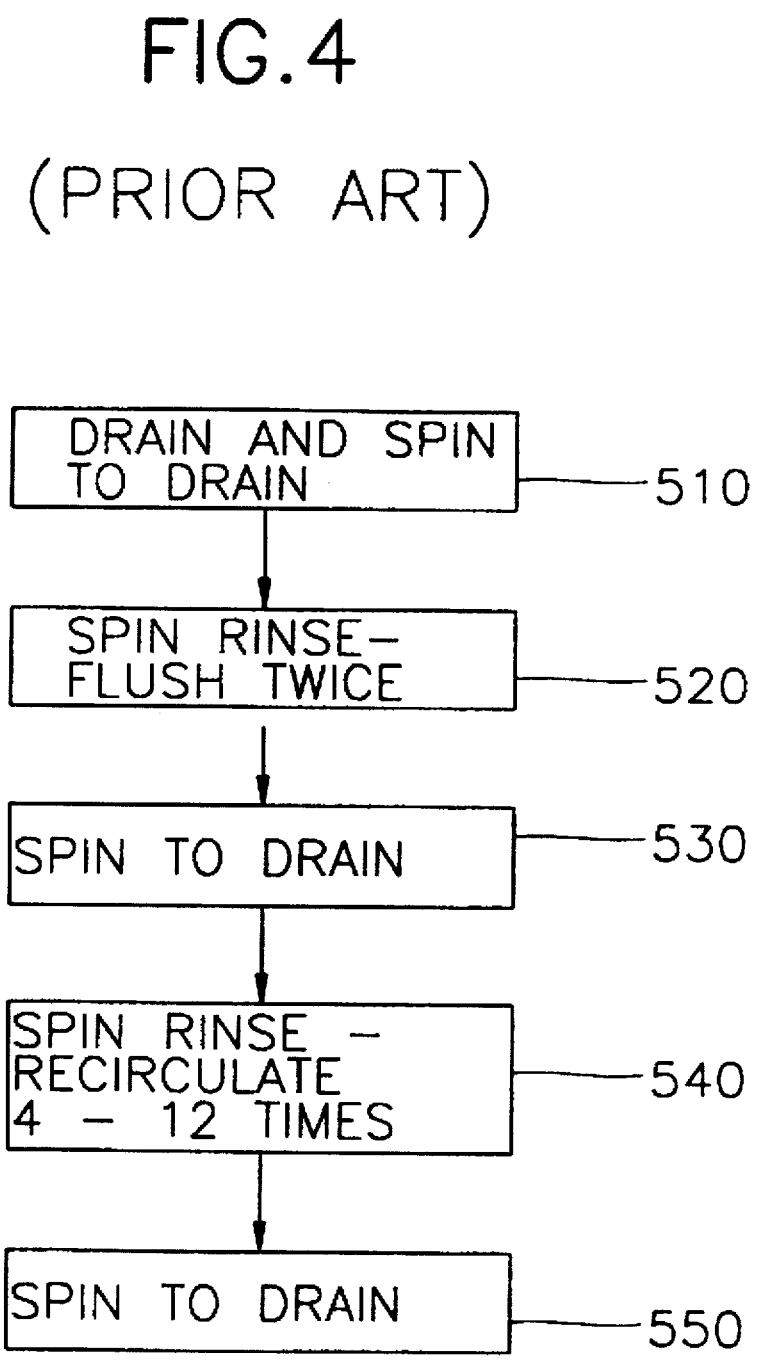

RINSING METHOD FOR A WASHING MACHINE

BACKGROUND OF THE INVENTION

1. Field of the Invention

The present invention relates to a rinsing method for a washing machine, and more particularly to a rinsing method for a washing machine, which can prevent the waste of washing liquid and improve the rinsing effect.

2. Prior Arts

A washing machine is an appliance for separating dirt from articles being washed such as clothing by sequentially carrying out various cycles in the order of water feeding, washing, rinsing, dehydrating, and draining cycles.

In the washing machine, dirt contained in the clothing is separated from the clothing by means of a detergent or friction between the washing liquid and the clothing while the above cycles are being executed. In particularly, impurities such as foam or detergent that remain in the clothing after the washing cycle has finished separate from the clothing and drain out of the washing machine while the rinsing cycle is being executed.

However, in conventional rinsing methods, after the washing cycle has finished, a large quantity of the washing liquid is repeatedly supplied and drained for rinsing the clothing so that not only some detergent which has deeply penetrated the clothing may remain in the clothing but also the washing liquid may be unnecessarily wasted.

In order to overcome the above problems, various rinsing methods for saving the washing liquid as well as removing the detergent in the clothing have been proposed, but they have presented many problems.

For example, U.S. Pat. No. 5,167,722 issued to Pastryk et al. discloses a spray rinse process for removing dirt and detergent contained in the clothing.

FIG. 4 shows a flow chart of the Pastryk's spray rinse process.

As shown in FIG. 4, the spray rinse process includes a first step 510 of draining the washing liquid from a wash zone after the washing cycle has finished, a second step 520 of introducing a first washing liquid into the wash zone, a third step 530 of draining the first washing liquid collected in a sump area out of the washing machine, fourth step 540 of introducing a second washing liquid into the wash zone through a spray nozzle and then circulating the second washing liquid 4 to 12 times, and a fifth step 550 of spinning a spin tub so as to drain the circulated washing liquid out of the washing machine.

In first step 510, the spin tub rotates at a predetermined speed so that the clothing loaded in the spin tub is forced toward the side wall of the spin tub by centrifugal force, thereby the washing liquid contained in the clothing discharges through perforated holes formed in the side wall of the spin tub.

In second step 520, the spin tub continuously rotates and the first washing liquid is supplied and drained two times. In addition, the first washing liquid is supplied such that it fully contacts the clothing.

In third step 530, the spin tub continuously rotates in order to extract out as much washing liquid as possible.

On the other hand, second and third steps 520 and 530 are repeated at least one time.

In fourth step 540, same as in the second step 520, the second washing liquid is supplied such that it fully contacts the clothing. In addition, the second washing liquid circulates such that the cumulative amount of the circulated washing liquid is greater than the amount necessary to saturate the clothing.

However, in the Pastryk's spray rinse process, the circulated washing liquid sprays onto the clothing through various circuits and nozzles in the washing machine in order to wash the circuits and nozzles as well. For this reason, it takes a long time to circulate the washing liquid, and thereby the spray rinse process requires much time for rinsing the clothing.

In addition, since the washing machine instantly drains the first washing liquid out of the washing machine without recirculating the first washing liquid, wasting of the washing liquid is still problematic in the Pastryk's spray rinse process.

SUMMARY OF THE INVENTION

The present invention has been made to overcome the above described problems of the prior arts, and accordingly it is an object of the present invention to provide a rinsing method for a washing machine, which can prevent the waste of the washing liquid and improve the rinsing effect.

To achieve the above object, the present invention provides a method of rinsing an article being washed in a washing machine having an outer tub for receiving washing liquid, a spin tub rotatably accommodated in the outer tub, a circulation pump for circulating the washing liquid into an upper portion of the outer tub, and a spraying nozzle assembly for spraying the washing liquid, the rinsing method comprising the steps of:

(1) introducing the washing liquid from a liquid source into the outer tub until it reaches a predetermined liquid level in the outer tub;

(2) spinning the spin tub such that the washing liquid contained in the article is discharged into a sump area formed between a bottom wall of the outer tub and a bottom surface of the spin tub;

(3) spraying the washing liquid into the spin tub by circulating the washing liquid collected in the sump area through the spraying nozzle assembly;

(4) spinning the spin tub such that the washing liquid sprayed onto the article is discharged into the sump area;

(5) repeating steps 3 and 4 at least one time;

(6) draining the washing liquid collected in the sump area out of the washing machine; and, (7) repeating steps 1 to 6 at least one time.

According to a preferred embodiment of the present invention, the rinsing method further comprises a step of ceasing the operation of the washing machine between steps 5 and 6, for discharging electricity of a condenser and for stabilizing the article.

Steps 3 and 4 are repeated in the range of two to four times.

Steps 1 to 6 are repeated in the range of four to six times.

In the rinsing method of the present invention as described above, the fresh washing liquid for rinsing the clothing is properly supplied to the outer tub according to the weight of the clothing loaded in the spin tub, so that the rinsing method of the present invention prevents the waste of the washing liquid.

In addition, since the washing liquid is strongly sprayed onto the clothing through the spraying nozzle assembly, not only the washing liquid for rinsing the clothing can be saved but also the particles of the detergent deeply permeated in the clothing can be easily separated from the clothing while the rinsing cycle is being executed, thereby improving the rinsing effect.

Further, according to the present invention, the circulated washing liquid sprays toward the upper portion of the spin tub as well as onto the clothing. Accordingly, the detergent remaining in the clothing can be easily dissolved and impurities such as foam or suds that have formed between the outer tub and the spin tub can be effectively removed during the rinsing cycle.

Furthermore, since the liquid for rinsing the clothing is instantly supplied to the clothing through the washing liquid feeding chamber formed in the upper portion of the outer tub, the time for rinsing the clothing can be shortened.

BRIEF DESCRIPTION OF THE DRAWINGS

The above objects and other advantages of the present invention will become more apparent by describing in detail preferred embodiments thereof with reference to the attached drawings, in which.

DESCRIPTION OF THE PREFERRED EMBODIMENTS

Hereinafter, the present invention will be described in detail with reference to the accompanying drawings.

Figure 1:
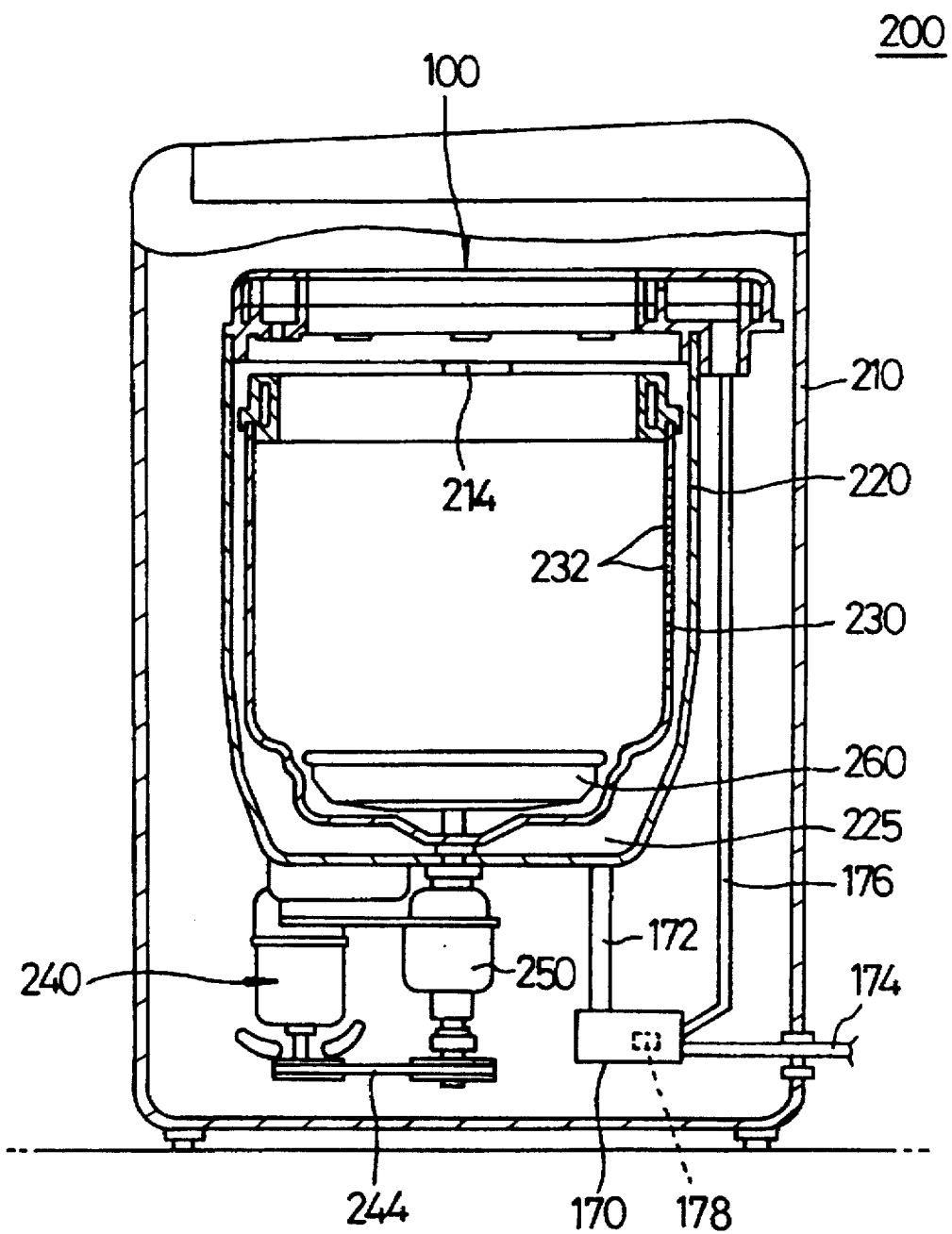
FIG. 1 is a schematic sectional view of a washing machine which performs a rinsing method of the present invention.

FIG. 1 shows a washing machine 200 according to one embodiment of the present invention.

As shown in FIG. 1, washing machine 200 has a housing 210. An outer tub 220 for receiving the washing liquid and a spin tub 230 which is accommodated in outer tub 220 and formed at its side wall with a plurality of discharging holes 232 are disposed in housing 210. At the lower portion of housing 220, there are provided a main motor 240 generating a rotational force and a gear assembly 250 which receives the rotational force from main motor 240 then transmits the rotational force to spin tub 230 or to a pulsator 260 mounted on the bottom wall of spin tub 230 alternatively. A spraying nozzle assembly 100 is mounted on the upper portion of outer tub 220 in order to spray the washing liquid onto the clothing.

In addition, a circulation pump 170 is disposed at the lower portion of housing 210. Circulation pump 170 circulates the washing liquid into spraying nozzle assembly 100 through a circulation tube 176 or drains the washing liquid out of washing machine 200 through a draining tube 174. In order to selectively close/open the flow of the washing liquid, a first valve(not shown) is disposed between circulation pump 170 and circulation tube 176, and a second valve (not shown) is disposed between circulation pump 170 and draining tube 174. A pump motor 170 for driving circulation pump 170 is provided in circulation pump 170.

Outer tub 220 is formed at its upper inner wall with a washing water feeding chamber 214 for supplying the washing liquid into outer tub 220 as washing machine 200 operates.

In addition, a detergent bucket(not shown) is inserted in washing liquid feeding chamber 214, so that the washing liquid mixed with the detergent is supplied into outer tub 220.

Figure 2:
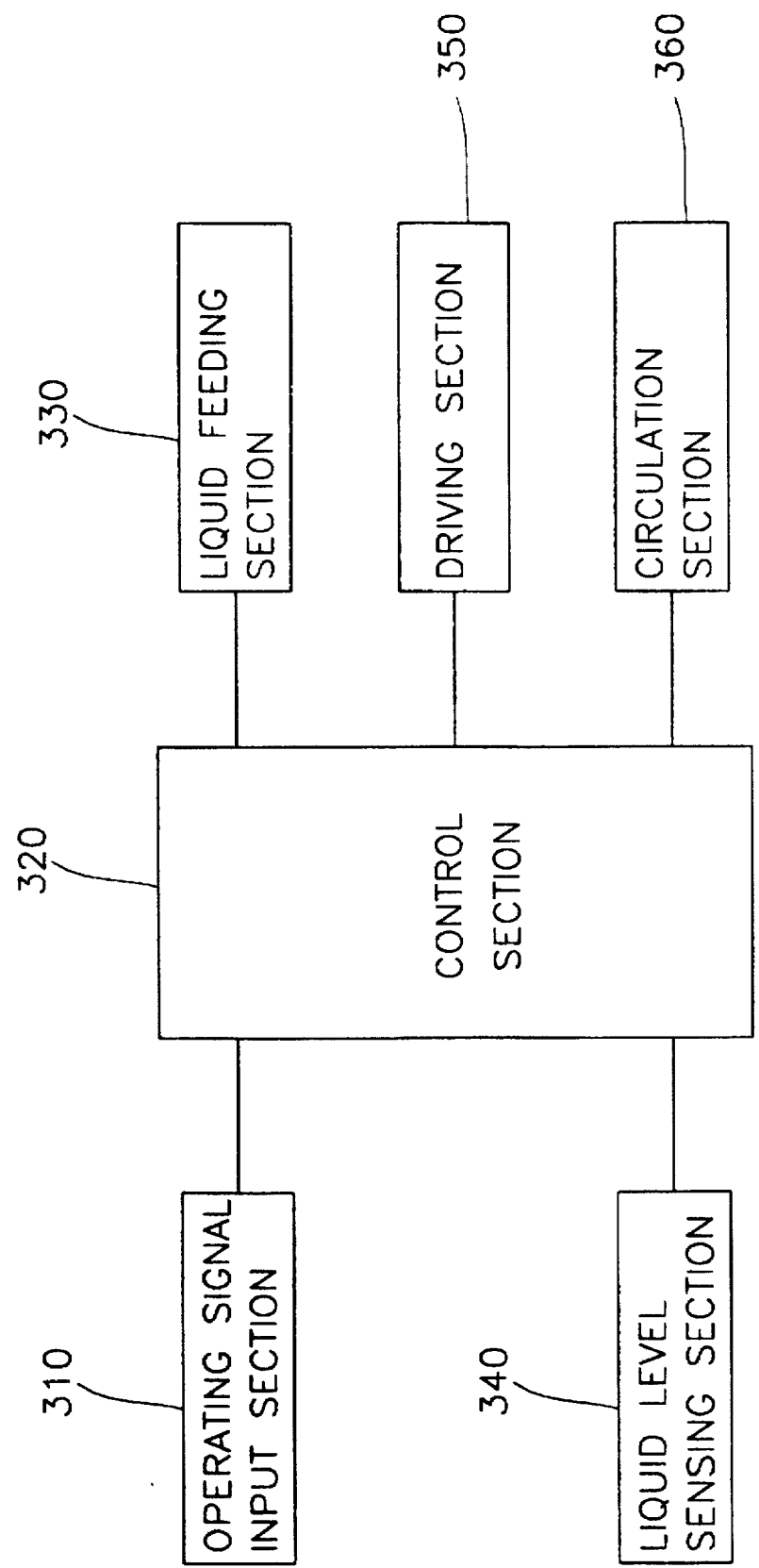
FIG. 2 is a block diagram for showing an arrangement of elements in the washing machine as shown in FIG. 1.

FIG. 2 is a block diagram for showing an arrangement of elements in washing machine 200.

As shown in FIG. 2, washing machine 200 has an operating signal input section 310, a control section 320 which generates a control signal according to a predetermined algorithm upon receiving an operating signal from operating signal input section 310, a liquid feeding section 330 for supplying the washing liquid into outer tub 220 as a liquid feeding signal is input from control section 320, a liquid level sensing section 340 which senses the liquid level in outer tub 220 and sends the data to control section 320, a driving section 350 which rotates spin tub 230 or pulsator 260 alternatively as a driving signal is input from control section 320, and a circulation section 360 which circulates the washing liquid filled in outer tub 220 and then sprays the circulated washing liquid on to the clothing according to a signal from control section 320.

Washing machine 200 constructed as described above according to the present invention operates as follows.

Firstly, when a user pushes an operating button, the operating signal is transmitted to control section 320 from operating signal input section 310. Upon receiving the operating signal from operating signal input section 310, control section 320 applies the liquid feeding signal to liquid feeding section 330, so that the washing liquid is introduced from a liquid source into outer tub 220 through washing liquid feeding chamber 214.

At this time, as mentioned above, liquid level sensing section 340 senses the liquid level in outer tub 220 and sends the data to control section 320. When the value of the data sensed by liquid level sensing section 340 reaches a predetermined value, control section 320 sends a signal for stopping the feeding of the washing liquid to liquid feeding section 330. At the same time, control section 320 applies the driving signal to driving section 350, thereby pulsator 260 rotates so as to start the washing cycle.

While the washing cycle is being executed, the washing liquid supplied from liquid feeding section 330 circulates through circulation section 360 and then sprays onto the clothing.

When the washing cycle has finished, the washing liquid filled in outer tub 220 drains out of washing machine 200 through draining tube 174, and then the rinsing cycle starts.

Figure 3:
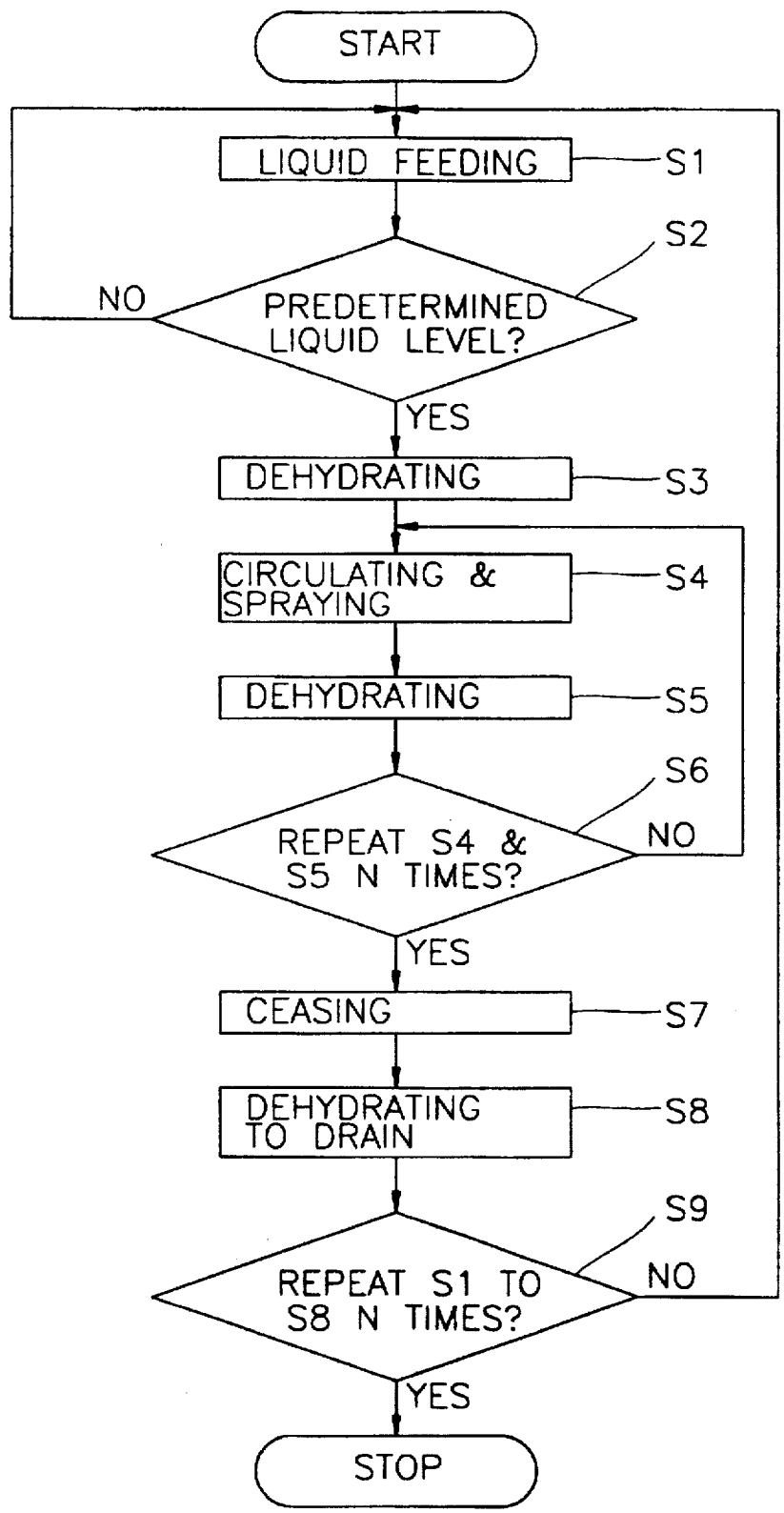
FIG. 3 is a flow chart of a rinsing method according to one embodiment of the present invention; and, FIG. 4 is a flow chart of a conventional rinsing method.

FIG. 3 shows a flow chart of a rinsing method according to one embodiment of the present invention.

As shown in FIG. 3, after the washing cycle has finished, control section 320 applies the liquid feeding signal to liquid feeding section 330 again, so that a first washing liquid is introduced from the liquid source into outer tub 220 through washing liquid feeding chamber 214 (step S1).

The first washing liquid is continuously supplied to outer tub 220 until it reaches a predetermined liquid level in outer tub 220. The predetermined liquid level means the liquid level in which the first washing liquid fully contacts the clothing loaded in the spin tub 230. The liquid level is preset in control section 320 such that it can be varied according to the weight of the clothing loaded in spin tub 230.

For example, when the weight of the clothing loaded in spin tub 230 is heavy, control section 320 applies a long signal to liquid feeding section 330 such that liquid feeding section 330 supplies a large quantity of the washing liquid to outer tub 220, and therefore the liquid level in outer tub 220 becomes a high level. On the contrary, when the weight of the clothing loaded in spin tub 230 is light, control section 320 applies a short signal to liquid feeding section 330 such that liquid feeding section 330 supplies a small quantity of the washing liquid to outer tub 220, and therefore the liquid level in outer tub 220 becomes a low level. Accordingly, when only a little clothing is loaded in spin tub 230, a small quantity of the washing liquid is supplied to outer tub 220, thereby preventing the waste of the washing liquid.

Then, liquid level sensing section 340 senses the level of the first washing liquid in outer tub 220 as a data and sends the value of the data to control section 320. Upon receiving the value of the data, control section 320 compares the value of the data with the preset liquid level and determines whether the liquid level in outer tub 220 has reached the predetermined liquid level (step S2).

When the liquid level in outer tub 220 reaches the predetermined liquid level, control section 320 applies the driving signal to driving section 350, so that main motor 240 rotates. The rotational force of main motor 240 is transmitted to spin tub 230 through a belt 244 and gear assembly 250, so that spin tub 230 rotates in the forward direction.

As spin tub 230 rotates, the clothing loaded in spin tub 230 is subjected to centrifugal force so that the clothing is forced toward the side wall of spin tub 230, and thereby the washing liquid contained in the clothing is discharged through a plurality of discharging holes 232 formed in the side wall of spin tub 230 (step S3). The first washing liquid that has discharged through discharging holes 232 is collected in a sump area 225 formed between a bottom wall of outer tub 220 and a bottom wall of spin tub 230.

Next, control section 320 applies an operating signal to circulation section 360, so that pump motor 178 accommodated in circulation pump 170 rotates in the reverse direction according to the predetermined algorithm which is preset in control section 320.

As circulation pump 170 rotates in the reverse direction, the first valve disposed between circulation pump 170 and circulation tube 176 is opened and the second valve disposed between circulation pump 170 and draining tube 174 is closed.

Accordingly, the first washing liquid collected in sump area 225 is sucked into circulation pump 170 through discharging tube 172 and then sprayed onto the clothing loaded in spin tub 230 by way of circulation tube 176 and spraying nozzle assembly 100 mounted on the upper portion of outer tub 220 (step S4).

Since the first washing liquid is also sprayed to the upper wall of spin tub 230, impurities such as foam or suds that have formed between outer tub 220 and spin tub 230 are effectively flushed while the spraying is being executed. In addition, through the above circulation and spraying of the first washing liquid, not only the amount of the washing liquid required to rinse the clothing is reduced but also the detergent remaining in the clothing, outer tub 220 and spin tub 230 rapidly dissolves, thereby shortening the rinsing time.

Further, since spraying nozzle assembly 100 strongly sprays the circulated washing liquid onto the clothing, even the particles of the detergent deeply permeated in the clothing are easily dissolved while the spraying of the washing liquid is being executed.

According to another embodiment of the present invention, spin tub 230 continues its rotation according to the signal from control section 320 while the first washing liquid sprays onto the clothing. In this case, the first washing liquid is sprayed onto the clothing more evenly, thereby resulting in an enhanced rinsing effect.

Then, control section 320 operates driving section 350 again so as to discharge the first washing liquid which has sprayed onto the clothing (step S5). Same as in step S3, the first washing liquid that has discharged through discharging holes 232 is collected in sump area 225.

Steps S4 and S5 are repeated several times according to the predetermined algorithm which is preset in control section 320 (step S6). Such a repetition ensures the improved rinsing effect. According to the preferred embodiments of the present invention, steps S4 and S5 are repeated in the range of two to four times.

When step S6 has finished, control section 320 sends a stop signal to driving section 350 and circulation section 360, then a ceasing step is followed for a predetermined time (step S7). Ceasing step S7 is required for discharging electricity of a condenser and for stabilizing the clothing, so that the time required for ceasing step S7 is short as compared with the time required for other steps.

After ceasing step S7 has lapsed, control section 320 applies again the operating signal to driving section 350 and circulation section 360, simultaneously. At this time, pump motor 178 accommodated in circulation pump 170 rotates in the forward direction according to the predetermined algorithm which is preset in control section 320. In addition, spin tub 230 also rotates again as driving section 350 operates.

As circulation pump 170 rotates in the forward direction, the first valve disposed between circulation pump 170 and circulation tube 176 is closed and a second valve disposed between circulation pump 170 and draining tube 174 is opened.

Accordingly, the first washing liquid collected in sump area 225 is sucked into circulation pump 170 through discharging tube 172 and is then drained out of the washing machine 200 through draining tube 174 (step S8). While step S8 is being executed, the rotation of spin tub 230 may continue in order to extract out as much washing liquid as possible.

On the other hand, even when step S8 has finished, foam or suds can be formed between outer tub 220 and spin tub 230 or on the clothing caused by the remaining detergent. Such a foam may deteriorate the rinsing effect and interrupt the rotation of spin tub 230, so that an energy loss may result.

In order to effectively remove the foam or suds, steps S1 to S8 are repeated several times according to the predetermined algorithm which is preset in control section 320 (step S9).

In step S9, a second washing liquid is supplied to outer tub 220 from the liquid source. Same as the first washing liquid, the second washing liquid circulates into the upper portion of outer tub 220 and then sprays toward the upper portion of spin tub 230 as well as onto the clothing. Accordingly, not only the foam or suds that have remained in washing machine 200 can be effectively removed but also the creation of new foam or suds can be restrained.

According to the preferred embodiments of the present invention, steps S1 to S8 are repeated in the range of four to six times.

When steps S1 to S8 have repeated in the range of the predetermined times, control section 320 finishes the rinsing cycle.

In the rinsing method of the present invention as described above, the fresh washing liquid for rinsing the clothing is properly supplied to the outer tub according to the weight of the clothing loaded in the spin tub, so that the rinsing method of the present invention prevents the waste of the washing liquid.

In addition, since the washing liquid strongly is sprayed onto the clothing through the spraying nozzle assembly, not only the washing liquid for rinsing the clothing can be saved but also the particles of the detergent deeply permeated in the clothing can be easily separated from the clothing while the rinsing cycle is being executed, thereby improving the rinsing effect.

Further, according to the present invention, the circulated washing liquid sprays toward the upper portion of the spin tub as well as onto the clothing. Accordingly, the detergent remained in the clothing can be easily dissolved and the impurities such as foam or suds that have formed between the outer tub and the spin tub can be effectively removed during the rinsing cycle.

Furthermore, since the washing liquid for rinsing the clothing is instantly supplied to the clothing through the washing liquid feeding chamber formed in the upper portion of the outer tub, the time for rinsing the clothing can be shortened.

While the present invention has been particularly shown and described with reference to the preferred embodiments thereof, it will be understood by those skilled in the art that various changes in form and details may be effected therein without departing from the spirit and scope of the invention as defined by the appended claims.

What is claimed is:

1. A method of rinsing an article being washed in a washing machine having an outer tub for receiving washing liquid, a spin tub rotatably accommodated in the outer tub, a circulation pump for circulating the washing liquid into an upper portion of the outer tub, and a spraying nozzle assembly for spraying the washing liquid, the rinsing method comprising the steps of:

(1) introducing the washing liquid from a liquid source into the outer tub until it reaches a predetermined liquid level in the outer tub;
    (2) spinning the spin tub such that the washing liquid contained in the article is discharged into a sump area formed between a bottom wall of the outer tub and a bottom surface of the spin tub;
    (3) spraying the washing liquid into the spin tub by circulating the washing liquid collected in the sump area through the spraying nozzle assembly;
    (4) spinning the spin tub such that the washing liquid sprayed onto the article is discharged into the sump area;
    (5) repeating steps 3 and 4 at least one time;
    (6) draining the washing liquid collected in the sump area out of the washing machine; and,
    (7) repeating steps 1 to 6 at least one time.

2. The rinsing method as claimed in claim 1, further comprising a step of ceasing the operation of the washing machine between the steps 5 and 6, for discharging an electricity of a condenser and for stabilizing the article.

3. The rinsing method as claimed in claim 2, wherein the time required for the ceasing step is short as compared with the time required for other steps.

4. The rinsing method as claimed in claim 1, wherein the predetermined liquid level is a liquid level in which the washing liquid fully contacts the article loaded in the spin tub, the liquid level being preset in a control unit such that it can be varied according to a weight of the article loaded in the spin tub.

5. The rinsing method as claimed in claim 4, wherein the liquid level is determined at a high level when the weight of the article is heavy, and the liquid level is determined at a low level when the weight of the article is light.

6. The rinsing method as claimed in claim 1, wherein in step 3, the washing liquid sprays toward an upper wall of the spin tub and the article, simultaneously.

7. The rinsing method as claimed in claim 6, wherein in step 3, the spin tub continuously rotates while the washing liquid is being sprayed toward the upper wall of the spin tub and the article.

8. The rinsing method as claimed in claim 1, wherein steps 3 and 4 are repeated in the range of two to four times.

9. The rinsing method as claimed in claim 1, wherein the spin tub continuously rotates while the step 6 is being executed.

10. The rinsing method as claimed in claim 1, wherein steps 1 to 6 are repeated in the range of four to six times.

11. A method of rinsing an article to be washed in a washing machine having an outer tub for receiving a washing liquid, a spin tub rotatably accommodated in the outer tub, a circulation pump for circulating the washing liquid into an upper portion of the outer tub, and a spraying nozzle assembly for spraying the washing liquid, the rinsing method comprising the steps of:

(1) introducing the washing liquid from a liquid source into the outer tub such that the washing liquid fully contacts the article loaded in the spin tub;
    (2) spinning the spin tub such that the washing liquid contained in the article is discharged into a sump area formed between a bottom wall of the outer tub and a bottom surface of the spin tub;
    (3) spraying the washing liquid toward an upper wall of the spin tub and the article simultaneously by circulating the washing liquid collected in the sump area through the spraying nozzle assembly, while maintaining the rotation of the spin tub at a predetermined speed;
    (4) spinning the spin tub such that the washing liquid sprayed onto the article is discharged into the sump area;
    (5) repeating steps 3 and 4 in the range of two to four times;
    (6) ceasing the operation of the washing machine for discharging electricity of a condenser and for stabilizing the article;
    (7) draining the washing liquid collected in the sump area out of the washing machine while maintaining the rotation of the spin tub; and,
    (8) repeating steps 1 to 7 in the range of four to six times.

* * * * *